(12) United States Patent
Lonero

(10) Patent No.: US 7,111,484 B2
(45) Date of Patent: Sep. 26, 2006

(54) PLUG-IN LOWER TOOL

(76) Inventor: Vincent J. Lonero, 2838 Tiburon Dr., Bldg. 26, Unit 102, Naples, FL (US) 34109

( * ) Notice: Subject to any disclaimer, the term of this patent is extended or adjusted under 35 U.S.C. 154(b) by 212 days.

(21) Appl. No.: 10/822,174

(22) Filed: Apr. 9, 2004

(65) Prior Publication Data

US 2005/0223769 A1    Oct. 13, 2005

(51) Int. Cl.
   B21D 15/00    (2006.01)
   B21D 37/00    (2006.01)
(52) U.S. Cl. .................. 72/110; 72/238; 72/481.7; 72/481.91; 72/482.92
(58) Field of Classification Search ................. 72/102, 72/107, 110, 237, 238, 413, 481.1, 481.3, 72/481.6, 481.7, 482.5, 482.91, 482.92
See application file for complete search history.

(56) References Cited

U.S. PATENT DOCUMENTS

| | | | | |
|---|---|---|---|---|
| 1,742,654 A | * | 1/1930 | Hahnemann | ................. 72/169 |
| 2,105,391 A | * | 1/1938 | Almdale | ................... 72/482.91 |
| 2,453,722 A | * | 11/1948 | Moss | ........................... 82/158 |
| 3,602,022 A | * | 8/1971 | Conrad et al. | ................ 72/238 |
| 4,706,483 A | * | 11/1987 | Perraudin | ....................... 72/84 |
| 4,924,687 A | * | 5/1990 | Francia | ......................... 72/102 |
| 5,572,899 A | * | 11/1996 | Balaity et al. | ................ 72/413 |
| 5,699,692 A | | 12/1997 | Lonero et al. | |
| 5,806,184 A | | 9/1998 | Lonero et al. | |
| 6,159,135 A | | 12/2000 | Lonero et al. | |
| 6,182,491 B1 | * | 2/2001 | Perlman et al. | .......... 72/405.09 |
| 6,253,590 B1 | | 7/2001 | Lonero et al. | |
| 6,257,037 B1 | | 7/2001 | Lonero et al. | |

\* cited by examiner

Primary Examiner—Ed Tolan
(74) Attorney, Agent, or Firm—Raggio & Dinnin, P.C.

(57) ABSTRACT

The present invention provides a plug-in lower tool for a deep rolling apparatus. The tool includes a housing having a recessed region that defines a seat for removable mounting of the tool and a passage in communication with the seat. The tool includes a reciprocable member engageable with the tool to removably support the same in the seat.

18 Claims, 3 Drawing Sheets

PLUG-IN LOWER TOOL

TECHNICAL FIELD

The present invention relates generally to tools and processes for deep rolling elongate work pieces such as crankshafts and camshafts, and relates more particularly to a lower tool for deep rolling having a plug-in mounting arrangement in a housing.

BACKGROUND OF THE INVENTION

Deep rolling apparatuses and deep rolling systems have been known in the art for many years. Prior art deep rolling systems generally use a lower tool in conjunction with an upper tool to deep roll compressive stresses into a crankshaft, for use in vehicles and other applications, increasing the strength around lobes or cams on the crankshaft. The need for deep rolling is becoming ever more important because automotive vehicles and components are being downsized to reduce weight and improve fuel efficiency; accordingly, smaller engines and crankshafts are increasingly needed. With smaller engines and crankshafts, made with less material than older, more robust designs, there is a need to improve the crankshaft's fatigue strength and durability. This improved fatigue strength and durability is accomplished through deep rolling of the fillets or lobes and other circular joint areas along the crankshaft. The strength and durability of crank pins of the main bearing journals can be significantly increased by forming compressive stresses into the annular fillets between the pin journals and the adjacent counter weights, or balancing webs on the crankshaft.

Some prior art lower tools use a system of rollers to support and roll the crankshaft while the upper tool employs work rolls that actually do the strengthening and finishing of the work piece. Other types of lower work tools also include work rolls which assist in forming the compressive stresses, along with the upper tool. In such a design, back up rollers operate to rotatably support the work rolls, which are held in place by a cage retainer and cage.

Relatively high mechanical forces are necessary to sufficiently compress/stress the work piece. As is well know in the mechanical arts, applications using higher forces tend to cause moving parts to wear out relatively more quickly than in designs using more modest forces. In a typical deep rolling operation, the work rolls and support rollers are encased in a modular tool that is supported in a housing. When servicing of any of the tool components is necessary, processing is stopped and the tools are disassembled from their respective housings for servicing and/or replacement. Accordingly, this halt in production has associated expenses relating to process down time, and is relatively labor intensive.

Therefore, there is a need in the art for a faster and easier way to replace or repair deep rolling tools.

SUMMARY OF THE INVENTION

It is one object of the present invention to provide a novel design for a removable deep rolling tool.

Another object of the present invention is to provide for relatively quick and easy installation and removal of rollers used to support a work piece in a deep rolling apparatus.

In accordance with the forgoing and other objects, the present invention provides a novel deep rolling tool design employing a spring detent mounted in a housing that positions and supports a deep rolling tool, providing for plug-in mounting of the tool therein.

DETAILED DESCRIPTION

Figure 1:
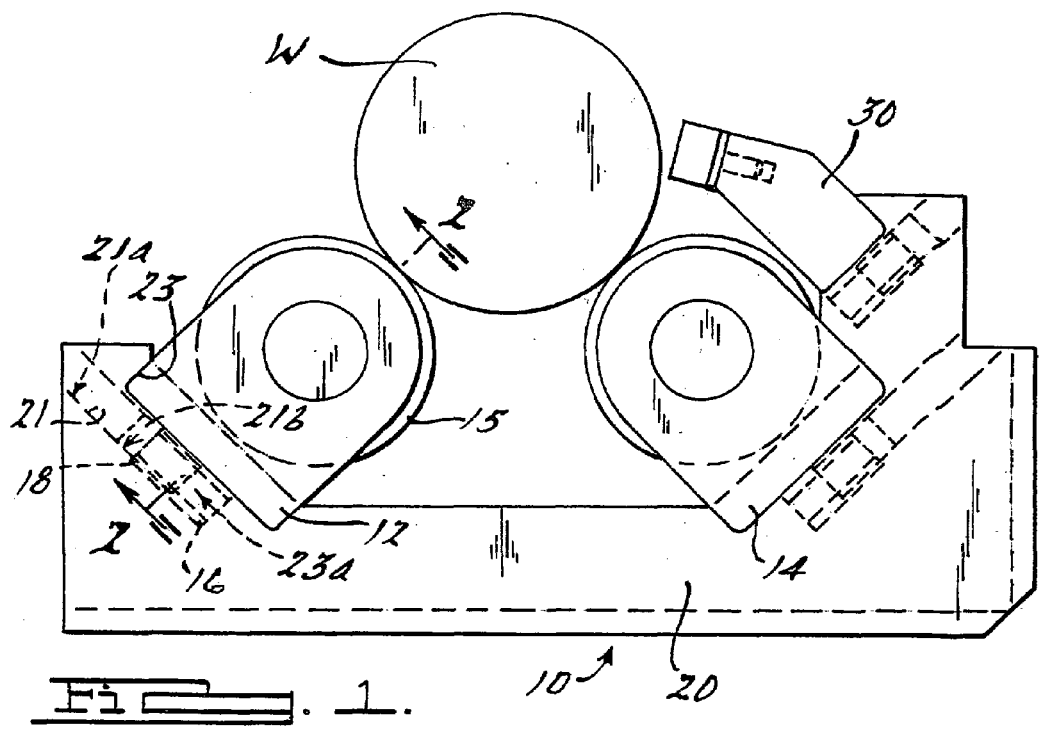
FIG. 1 is an end view of a lower tool and work piece according to the present invention.

Referring to FIG. 1, there is shown an end view of a lower tool 10 for deep rolling according to the present invention. Lower tool 10 preferably includes a housing 20 within which a plurality of roller modules or tool casings 12 and 14 are preferably positioned. A work piece "W" is preferably rotatably supported by roller modules 12 and 14, whereby it can be deep rolled in a conventional manner via an upper tool ("not shown"). In a preferred embodiment, modules 12 and 14 provide a roller mechanism for rotating and supporting the work piece while an upper tool actually performs the compressive pre-stressing work. It should be appreciated, however, that the designs disclosed herein are similarly applicable to deep rolling apparatuses wherein either or both of the upper and lower tools are used to actually modify the work piece. A positioning member 30 is preferably provided, and also mounted in housing 20. Positioning member 30 assists in appropriately positioning work piece "W" with respect to the upper tool and lower tool 20. Each of roller modules 12 and 14 preferably includes a roller, denoted with numeral 15 in roller module 12, rotated beneath work piece W. Each of roller modules 12 and 14 preferably slides into a recessed region or seat 23 in housing 20 that supports roller modules 12 and 14. In a preferred embodiment, each recessed region 23 preferably comprises a substantially rectangular seat that receives each of the roller modules in a substantially mating fashion. The present description refers largely to only one of the illustrated lower tools 12, however, those skilled in the art will appreciate that the descriptions herein are similarly applicable to either of the illustrated tools 12 and 14. In the apparatus illustrated in FIG. 1, the various features of housing 20 relating to tools 12 and 14, e.g. the seat 23 and passage 21 described herein, are preferably substantially mirror images.

Figure 5:
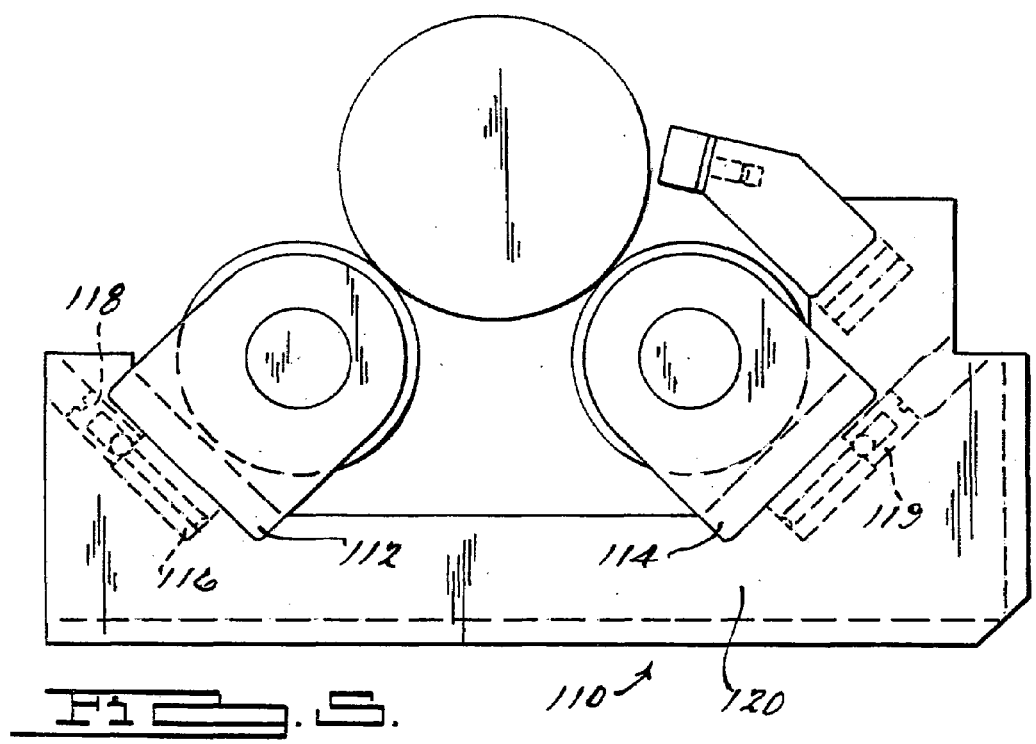
FIG. 5 is an end view of a lower tool and work piece according to the present invention.
Figure 6:
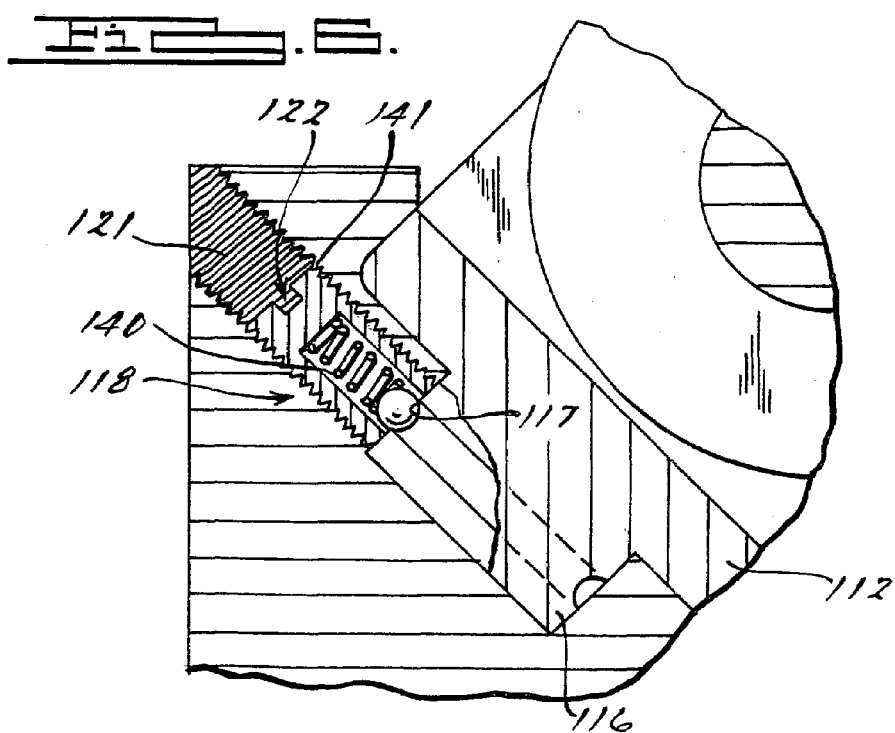
FIG. 6 is a partial side view of a spring detent mechanism and lower tool according to the present invention.

Turning now to FIG. 5, there is shown a lower tool apparatus 110 in accordance with the present invention. Apparatus 110 is similar to apparatus 10, and like numerals are used to identify similar features where appropriate. Thus, apparatus 110 includes first and second roller modules 112 and 114, mounted in a housing 120. Spring detents 118 and 119 are provided and allow roller modules 112 and 114 to be plugged in to housing 120. In one preferred embodiment, a positioning member 130 is provided and equipped with a spring detent mechanism (not shown) similar to those described with respect to modules 112 and 114. FIG. 6 illustrates a close up view of spring detent 118. As illustrated, spring detent 118 comprises a body member having an internal ball 150 and spring 140 mechanism. Spring detent 118 is preferably constructed such that ball 150 may be pushed completely into the body of spring detent 118, overcoming the bias of spring 140, but cannot be pushed completely out of engagement therein. Accordingly, a portion of spring detent 118 is preferably mounted within a passage 121 in housing 120, and is adapted to retain the roller module in housing 120 by urging ball 150 into engagement therewith. In a preferred embodiment, spring detent 118 is threaded into passage 121 to a desired depth in housing 120. Other means for positioning and retaining spring detent 118 in housing 120 are contemplated, and the description herein of a threaded engagement should not be taken as limiting. A recess 122 may be formed in a head 141 of spring detent 118 that is adapted to receive a screwdriver for threadedly engaging spring detent 118 in passage 121.

Roller module 112 preferably includes an extension 116 depending therefrom that preferably includes a shaped detent surface 117 adapted to engage with ball 150. Spring 140 continually urges ball 150 outwardly, and accordingly, when roller module 112 is placed into housing 120, extension 116 can be urged past ball 150, overcoming the force of spring 140, such that surface 117 is engaged by ball 150, locking roller module 115 in place. Removal of roller module 115 takes place either by pulling outwardly on the module with sufficient force to overcome the detent action of spring detent 118, or by backing spring detent 118 outwardly in passage 121 such that ball 150 disengages with extension 116.

The preferably threaded engagement of spring detent 118 in housing 120 allows spring detent 118 to be positioned at a carefully selected depth in passage 121. In particular, the spring detent 118 can be positioned such that ball 150 is extensible by spring 140 a desired distance past an inner end 122 of passage 121. Accordingly, the relative ease with which engagement between ball 150 and extension 116 may be overcome is adjustable. For example, where it is desirable to manually pull roller module 112 out of housing 120, spring detent 118 can be rotated a first direction within passage 121 to allow for easier disengagement of ball 150 from extension 116. Similarly, it can be rotated an opposite direction to provide for relatively tighter retention of roller module 115. It should be noted that detent 118 may be press fit in orifice 121 or may use any other known mechanical or chemical fastening process. Alternative embodiments are contemplated wherein a spring ball detent is positioned in module 112, and extends into engagement with a complementary portion of the housing. Further still, rather than a spring detent as described herein, the apparatus might use a simple threaded member that could be alternately extended or retracted from passage 121, into or out of engagement with the tool.

Returning to FIGS. 1–4, roller modules 12 and 14 are preferably retained in housing 20 via an alternative spring-loaded mechanism. In a preferred embodiment each of roller modules 12 and 14 includes an extension 16 that depends from a lower portion of the roller module. When the roller module 12, 14 is positioned in its respective seat 23, extension 16 is inserted through an aperture 23a in communication with seat 23. A passage 21 is preferably formed in housing 12 and is in communication with aperture 23a. A reciprocable pin 18 is engaged with and movable relative to extension 16, and preferably slidable relative thereto to provide for plug-in engagement of roller modules 12 and 14 with housing 20.

Figure 3:
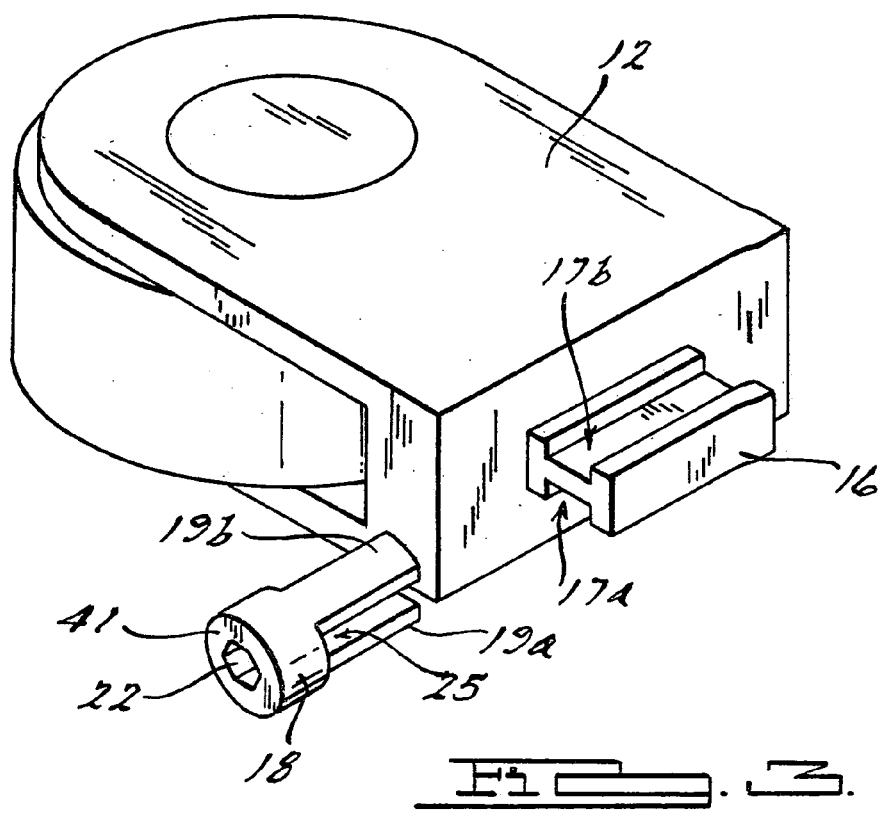
FIG. 3 is a partial perspective view of the plug-in lower tool of FIG. 1.
Figure 4:
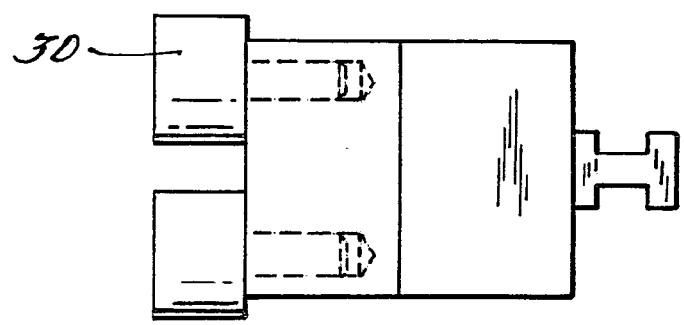
FIG. 4 is a positioning member for a deep rolling tool according to the present invention.

In FIG. 3, there is shown in perspective a portion of a roller module extension 16, and pin 18 that is slidably engageable therewith. In a preferred embodiment pin 18 comprises first 19a and second 19b legs, separated by a slot 25, that slidably engage about a substantially complementary portion of extension 16. In particular, in one preferred embodiment each of legs 19a and 19b slide into engagement about extension 16 via channels 17a and 17b formed therein, preventing relative displacement between pin 18 and module 12 in a direction perpendicular to the direction of sliding of pin 18. A spring, for example a helical spring, may be positioned within slot 25 of pin 18, and can bias pin 18 toward an extended position relative to extension 16. Pin 18 further preferably includes a head 41, which may have a slot 22 formed therein for engagement by a manual tool, as described herein.

Figure 2:
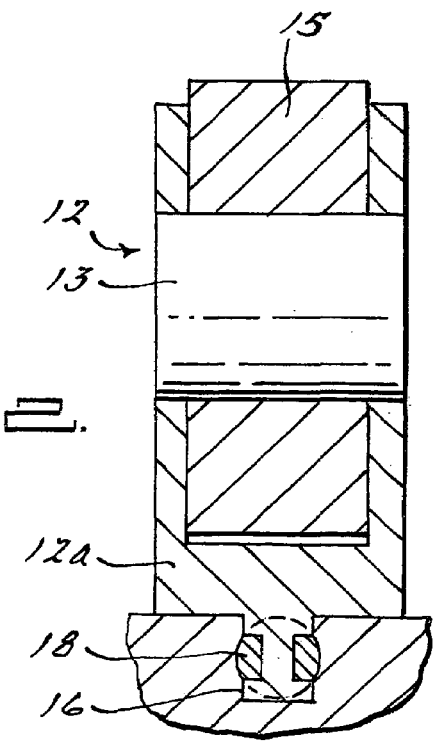
FIG. 2 is a partial sectioned view taken along line 2—2 of FIG. 2.

Pin 18 may preferably be pushed into engagement about extension 16 when module 12 is mounted in housing 20. One means for pushing pin 18 into the position illustrated in FIG. 2 is with a tool inserted via an end of passage 21. In a preferred embodiment, passage 21 comprises a first portion 21a having a first diameter and a second portion 21b having a second diameter greater than said first diameter. Pin 18 is therefore preferably slidable in passage 21b formed in housing 20, and is urged therein toward an extended position by a spring (not shown). Second passage 21a preferably includes a diameter slightly smaller than the diameter of pin 18, and connects with an outside end of passage 21, allowing the tool (not shown) to be inserted therein to push pin 18 towards its retracted position. The preferably lesser diameter of the first portion 21a prevents pin 18 from being urged completely through passage 21. In a preferred embodiment, pin 18 thus remains partially about extension 16, preferably prevented from disengagement therewith via an interface of legs 19a and 19b with channels 17a and 17b. In the retracted position of pin 18, roller module 12 may be disengaged from housing 20. When pin 18 is in the extended position, it resists disengagement of roller module 12 from tool 20 by abutting against the wall of passage 21.

The present embodiment of FIG. 1, by using slidable pin 18 therefore allows relatively easy engagement and disengagement of roller modules 12 and 14 with housing 20. When it is desirable to replace or service a worn roller module, for example, a tool can be inserted into passage 21 and used to urge pin 18 to its retracted position at which module 12 may be pulled from housing 20. In the embodiment of FIG. 5, a tool can be inserted into the passage to rotate the spring detent, adjusting the spring detent axially therein with respect to the tool module.

Turning now to FIG. 2, which is a partially sectioned view taken along line 2—2 of FIG. 1, there are illustrated the preferred internal components of roller module 12 and one preferred geometry of extension 16. In the FIG. 2 embodiment, module 12 comprises a main roller 15 that rotates around a backup roller 13. Thus, in a deep rolling process roller 15 engages with the rotating work piece and is supported by back up roller 13, which rotates on an axle supported by roller module 12. Extension 16 extends downwardly from a body portion 12a of roller module 12, and may comprise a substantially I-shaped cross section, as shown in FIG. 3. Alternatively, extension 16 can be formed with an annulus extending around the exterior thereof. It should be appreciated that the design of extension 16 and pin 18 is exemplary only, and could be varied significantly without departing from the scope of the present invention. Moreover, pin 18 need not engage with an "extension" at all; rather, tool 12 might be constructed such that pin 18 reciprocates within a bore formed directly in tool 12, or it might engage with an extension or other feature by means other than that disclosed. Still further embodiments are contemplated wherein pin 18 threadedly engages with the tool or an extension thereon and is "reciprocated" by rotation.

The present invention thus provides significant advantages over earlier designs wherein the tools were semi-permanently fixed into their respective housings. Utilizing the present invention, it is no longer necessary to take the time consuming steps of disassembling the apparatus to replace or service a worn tool. An operator can readily plug a roller module into its housing, allowing the detent mechanism such as the described spring detent or reciprocable pin to secure the tool therein. To remove the roller module, the tool can be pulled from the housing, as in the embodiment utilizing the spring detent 118, or it can be readily removed with the aid of a tool, such as in the embodiment utilizing the reciprocable pin 18. While the present description has focused primarily on applications of the present invention to a particular lower tool design, those skilled in the art will appreciate that various upper and lower tools and related roller systems might benefit through the application of the present invention.

The present description is thus for illustrative purposes only, and should not be construed to narrow the breadth of the present invention in any way. Thus, those skilled in the art will appreciate that various modifications might be made to the presently disclosed embodiments without departing from the spirit and scope of the invention. Other aspects, features, and advantages will be apparent upon an examination of the attached drawing figures and appended claims.

What is claimed is:

1. A deep rolling tool apparatus comprising:
    a housing having a plurality of recessed regions each defining a seat;
    a tool positionable in each of said seats;
    a plurality of detents arranged in said housing adapted to engage with said tools, said detents comprising a pin having first and second ends and a channel extending axially within from one end, said first end comprises a shaped recess for receipt of a tool;
    a spring member positioned in said channel;
    a ball reciprocable in said channel, said ball biased by said spring toward said second end and partially extensible past the same for engagement with a substantially complementary portion of one of said tools; and
    wherein a positioning of the tool in the seat engages the ball with the tool, removably securing the same in the housing.

2. The apparatus of claim 1 comprising a biasing member for biasing said locking member toward an extended position.

3. The apparatus of claim 1 wherein said tool comprising a rolling element or a positioning member.

4. The apparatus of claim 2 wherein said tool comprises an extension adapted to extend into said recessed region, a partial insertion of said extension therein initially urges said locking member into said housing, whereafter a complete insertion of the extension allows said locking member to extend into said seat and secure the tool therein.

5. The apparatus of claim 4 wherein said locking member is a ball.

6. The apparatus of claim 5 comprising a circumferential groove on said extension, said groove adapted to engage with said ball when extended into said seat thereby securing the tool therein.

7. The apparatus of claim 1 comprising a threaded passage in said housing that threadedly receives said detent.

8. The apparatus of claim 7 wherein said detent is externally threaded.

9. An apparatus for deep rolling of an elongate work piece comprising:
    a housing having a recessed region defining a seat;
    a tool engageable in said seat, said tool comprising a rolling element and an extension extending from a lower end of said tool;
    a first locking member mounted in said housing and reciprocable between a retracted position and an extended position at which said member extends into said recessed region;
    whereupon placing said tool in said seat engages said member with said extension of said tool, removably securing the same in said housing.

10. The apparatus of claim 9 comprising biasing means for biasing said locking member toward its extended position.

11. The apparatus of claim 10 wherein said biasing means is a helical spring.

12. The apparatus of claim 9 wherein said first locking member comprises a pin slidable in said housing.

13. The apparatus of claim 9 wherein said recessed region is substantially complementary with said tool and adapted to support the same.

14. The apparatus of claim 9 further comprising:
    a positioning member having a body and a head adapted to engage with a workpiece supported in part by said tool; and
    a second locking member in said housing adapted to engage with and removably secure said positioning member.

15. A deep rolling apparatus comprising:
    an upper tool comprising a rolling element for engagement with a work piece;
    a lower tool housing defining at least one substantially rectangular seat;
    a lower tool positionable in said seat, said lower tool comprising a rolling element;
    a detent comprising a member moveable between a first position at which it locks said tool in said seat and a second position at which said tool is removable from said seat.

16. The apparatus of claim 15 wherein said detent is mounted in said housing and extensible into engagement with said tool.

17. The apparatus of claim 15 wherein said detent comprises a member mounted to said tool and extensible into said housing.

18. The apparatus of claim 15 wherein said detent comprises a spring-biased ball.

* * * * *